United States Patent [19]

Gillespie

[11] Patent Number: 4,567,663
[45] Date of Patent: Feb. 4, 1986

[54] MEASURING DEVICE

[75] Inventor: Kurtis R. Gillespie, Grand Haven, Mich.

[73] Assignee: Dimension Products Corporation, Spring Lake, Mich.

[21] Appl. No.: 660,697

[22] Filed: Oct. 15, 1984

[51] Int. Cl.⁴ .............................................. G01B 7/02
[52] U.S. Cl. ................................ 33/143 L; 33/125 R; 33/147 E
[58] Field of Search ............. 33/143 L, 147 E, 147 N, 33/143 R, 125 R, 125 C, 125 A, 147 T

[56] References Cited

U.S. PATENT DOCUMENTS

| | | | |
|---|---|---|---|
| 3,142,121 | 7/1964 | Stefanov | 33/143 L |
| 4,008,523 | 2/1977 | von Voros | 33/143 L |
| 4,063,086 | 12/1977 | Hirose | 250/237 G |
| 4,063,362 | 12/1977 | Amsbury et al. | 33/143 L |
| 4,096,384 | 6/1978 | Sartorio et al. | 250/237 G |
| 4,097,996 | 7/1978 | Yamazawa et al. | 33/1 M |
| 4,120,538 | 10/1978 | Headen | 308/6 C |
| 4,170,067 | 10/1979 | Yoke et al. | 33/143 L |
| 4,187,612 | 2/1980 | Scott | 33/172 E |
| 4,229,883 | 10/1980 | Kobashi | 33/143 L |
| 4,250,381 | 2/1981 | Yoshiike et al. | 33/125 C |
| 4,255,861 | 3/1981 | Nakata et al. | 33/166 |
| 4,261,106 | 4/1981 | Takizawa | 33/125 C |
| 4,376,543 | 3/1983 | Sakagami | 277/237 R |
| 4,399,613 | 8/1983 | Nishikata et al. | 33/143 M |
| 4,399,617 | 8/1983 | Yoshioka | 33/169 R |
| 4,414,746 | 11/1983 | Takizawa | 33/125 R |

FOREIGN PATENT DOCUMENTS 84624  11/1982  European Pat. Off. .......... 33/125 R

OTHER PUBLICATIONS

Publication entitled "Quantum Scale Installation Manual".
Publication entitled "Anilam Electronics Corporation Wizard Digital Readouts Operating Manual".

Primary Examiner—Willis Little
Attorney, Agent, or Firm—Price, Heneveld, Huizenga & Cooper

[57] ABSTRACT

A device for measuring a linear dimension of an article for quality control and fabrication purposes includes an elongated, wheeled support having a stationary anvil secured adjacent an end of the support. A carriage is positionable along the longitudinal axis of the support. The carriage slides on spaced, parallel tracks and supports a movable anvil. A digital display is electrically connected to an encoder or reader mounted on the carriage which generates an output indicating the displacement of the movable carriage and anvil with respect to the fixed anvil. Support bars may be placed on the track to support the article being measured.

6 Claims, 6 Drawing Figures

MEASURING DEVICE

BACKGROUND OF THE INVENTION

The present invention relates to measuring devices and more particularly to an apparatus for measuring the linear dimensions of an article.

Various devices have heretofore been proposed and are presently available for measuring various dimensions of an article to determine if the article is within specifications or manufacturing tolerances. Some of these devices may also be used to mark or scribe stock material prior to performing fabrication steps. Among such devices are rulers, tape measurers, calipers, micrometers and height gauges. The prior devices may include mechanical and/or digital displays. Examples of prior proposals may be found in U.S. Pat. No. 4,229,883 entitled MEASURING INSTRUMENT WITH DIGITAL DISPLAY and issued on Oct. 28, 1980 to Kobashi; U.S. Pat. No. 4,255,861 entitled ELECTRICALLY DIGITAL DISPLAY MICROMETER and issued on Mar. 17, 1981 to Nakata et al; U.S. Pat. No. 4,399,613 entitled TWO-LEG VERNIER CALIPERS AND ITS MANUFACTURING METHOD and issued on Aug. 23, 1983 to Nishikata et al; and U.S. Pat. No. 4,399,617 entitled HEIGHT GAGE and issued on Aug. 23, 1983 to Yoshioka.

In many of the previous devices, a pinion engaging a rack or a photoelectrical reader riding along a glass scale having gradations thereon may be used for measuring displacement of a movable portion of the device and providing a digital readout. Examples of digital readouts may be found in U.S. Pat. No. 4,063,086 entitled SCALE READING APPARATUS and issued on Dec. 13, 1977 to Hirose; U.S. Pat. No. 4,096,384 entitled POSITION TRANSDUCER FOR MACHINE TOOLS AND MEASURING MACHINES and issued on June 20, 1978 to Sartorio et al; and U.S. Pat. No. 4.187,612 entitled HEIGHT GAGE and issued on Feb. 12, 1980 to Scott.

In many industries, it is important to accurately measure elongated sheet stock, templates, panels and the like which have linear dimensions on the order of 100 inches or more. Such articles, due to weight or size, must be supported while being measured. Precise measurement of such articles establishes the accuracy of the manufacturing process, permits the selection of accurately matching parts and allows quality control checking of articles supplied by subcontractors. Presently available measuring devices have not allowed the accurate, reliable and simple measurement of such articles. A need, therefore, exists for a reliable, easy to use and accurate apparatus which permits the measurement of articles having a relatively wide range of sizes or which must be supported other than by hand.

SUMMARY OF THE INVENTION

In accordance with the present invention, the aforementioned needs are substantially fulfilled. Essentially, an apparatus or device is provided which includes an elongated support or beam having a planar upper surface and a stationary anvil fixed to the support adjacent an end thereof. A carriage mounts a movable anvil and provision is made for sliding the carriage and hence the movable anvil towards and away from the stationary anvil. A linear measuring means on the carriage and the support generates an output indicating the position and displacement of the movable anvil relative to the fixed anvil.

In narrower aspects of the invention, a pair of spaced, opposed and parallel elongated guides or tracks extend along the planar upper surface of the support. Linear bushings mount the carriage on the guides for movement. A photoelectrical reader in conjunction with a glass etched scale or a pinion driven encoder in conjunction with an accurately machined rack measure the displacement of the carriage and movable anvil along the support.

DETAILED DESCRIPTION OF THE PREFERRED EMBODIMENT

Figure 1:
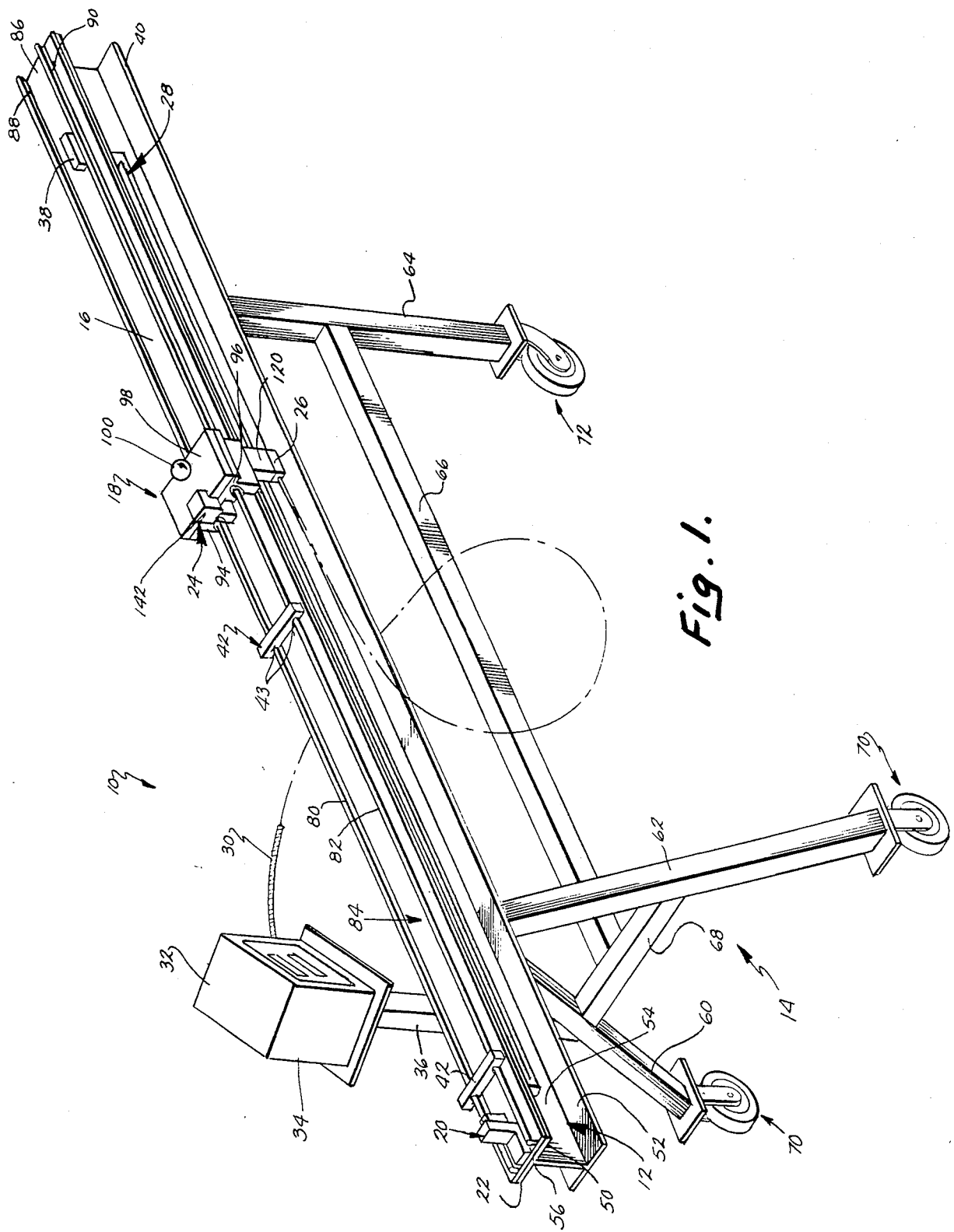
FIG. 1 is a perspective view of a measuring device in accordance with the present invention including a photoelectrical reader and linear scale.

A measuring device or apparatus in accordance with the present invention is illustrated in FIG. 1 and generally designated 10. Device 10 includes an elongated support 12 mounted on a wheeled support frame 14. Supported on an upper surface of support 12 is a guide or track subassembly 16. Slidably mounted on subassembly 16 is a carriage 18. A stationary anvil 20 is fixed to support 12 adjacent an end 22 thereof. Anvil 20 defines a fixed reference point. A movable anvil 24 is secured to carriage 18.

In the embodiment of FIG. 1, a photoelectrical reader 26 is secured to carriage 18. A linear scale subassembly 28 is fixed to support 12. As discussed below, reader 26 and scale subassembly 28 accurately measure the displacement and position of carriage 18 and movable anvil 24 relative to the fixed anvil 20. Reader 26 is electrically connected by a cable 30 to a digital readout or display 32. Display 32 is supported on a table 34 secured to an arm 36. Arm 36 is mounted on the wheeled frame 14. A slide stop 38 is fixed to support 12 adjacent an end 40 opposite the stationary or fixed anvil 20. Stop 38 limits movement of carriage 18. As discussed below, a plurality of bars 42 having notches 43 are positionable on the guide means 16 to support articles to be measured.

In the preferred embodiment, support 12 is an elongated, steel I-beam having an upper flange 50, a lower flange 52 and a center web 54. Flange 50 defines a horizontal, planar upper surface 56. Surface 56 is accurately formed or machined to be essentially flat. Wheeled frame 14 includes tubular members 60, 62 and 64 welded or otherwise suitably secured to lower flange 52 of the I-beam support. Cross pieces 66, 68 extend between tubular members 60, 62 and 64. Wheels 70, 72 are secured to the tubular members.

Track subassembly 16 includes a pair of elongated, opposed, parallel, generally circular shafts or rails 80, 82 mounted on a support 84. Support 84 includes a base 86 and sides 88, 90. Shaft 80 is secured to side 88 and shaft 82 is secured to side 90. Assembly 16 is bolted or otherwise suitably secured to upper planar surface 56 of flange 50.

Figure 2:
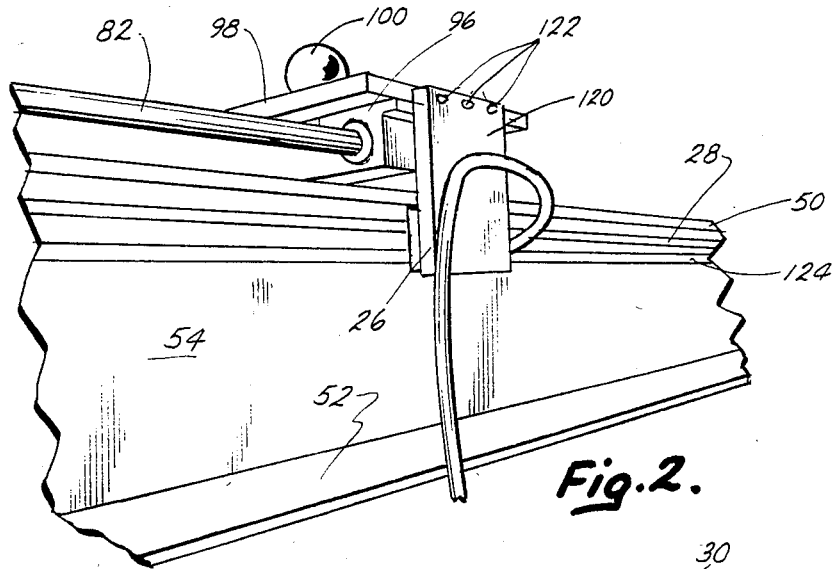
FIG. 2 is an enlarged, fragmentary, perspective view of the device of FIG. 1 showing the carriage.

Carriage subassembly 18 includes a pair of ball bushing pillow blocks 94, 96 which ride on and receive shafts 80, 82, respectively. Extending between and secured to pillow blocks 94, 96 is a top plate 98. A handle 100 is secured to plate 98. As seen in FIGS. 1 and 2, each pillow block 94, 96 defines an elongated bore. Ball bearings within the pillow blocks ride on and engage the shafts. The linear ball bushing pillow block assemblies 94, 96 are conventional items and are sold, for example, under the brand name Thomson Ball Bushings. Such assemblies are of the general type shown in U.S. Pat. No. 4,120,538 entitled PILLOW BLOCK INCLUDING A PLURALITY OF SELF-ALIGNING LINEAR MOTION BEARINGS and issued on Oct. 17, 1978 to Headen. The linear ball bearing supported carriage subassembly in conjunction with the parallel two-track rail or guide subassembly 16 insures very precise movement and positioning of the carriage. This increases the accuracy and repeatability of measurement.

Figure 3:
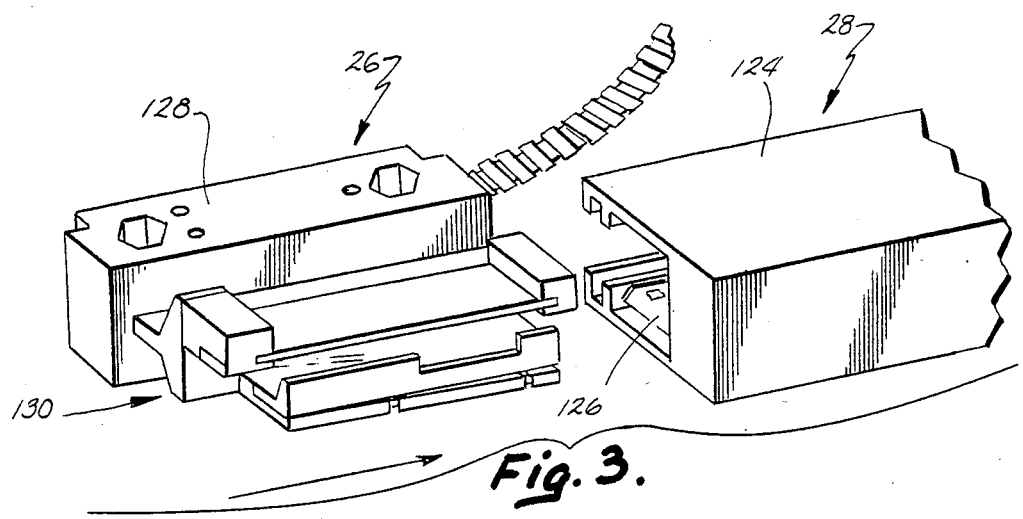
FIG. 3 is a fragmentary, exploded view showing a portion of the photoelectrical reader and linear scale.

In the embodiment shown in FIGS. 1 and 2, a support bracket 120 is secured by suitable fasteners 122 to top plate 98 of carriage 18. Mounted on the support plate 120 is the photoelectrical reader 26. Linear scale subassembly 28 includes an elongated, channel-shaped case 124. Case 124 supports a glass etched scale 126 (FIG. 3). Scale 126 has gradations formed thereon or alternating light and dark areas. Reader 26 includes a housing 128 adapted to ride within the elongated slot defined by the case 124. Secured to housing 128 is a photoelectrical head subassembly 130. Subassembly 130 includes a light source such as an infrared diode and sensors such as phototransistors. The reader generates an output signal as it passes along the linear scale 126. The output signal is transmitted by cable 30 to the digital display or readout 32. The reader accurately measures the position and displacement of carriage 18 along the linear scale. Changes in the dark and brightness of the light sensed by the phototransistors are converted into electrical signals which are counted and displayed electrically on the display 32. The reader and linear scale are commercially available items and may be of the type sold by Anilam Electronics Corporation, Miami, Fla., under the brand name Quantum Scale.

The scale case 124 is secured to the undersurface of flange 50. The undersurface of flange 50, if necessary, is machined so that the case is parallel to shafts 80, 82 and hence the plane of movement of carriage 18. A front surface 140 of fixed anvil 20 and a front surface 142 of movable anvile 24 are precisely machined so that they accurately abut in a vertical plane when moved up against each other. The precise positioning and alignment of the anvils, the track or guide subassembly 16, the glass etched scale 28 and the reader 24 insure accurate measurement. As explained in more detail below, the positioning and displacement of anvil 24 with respect to anvil 20, as displayed on readout 32, provides the accurate measurement of a linear dimension of an article supported on bars 42.

Figure 4:
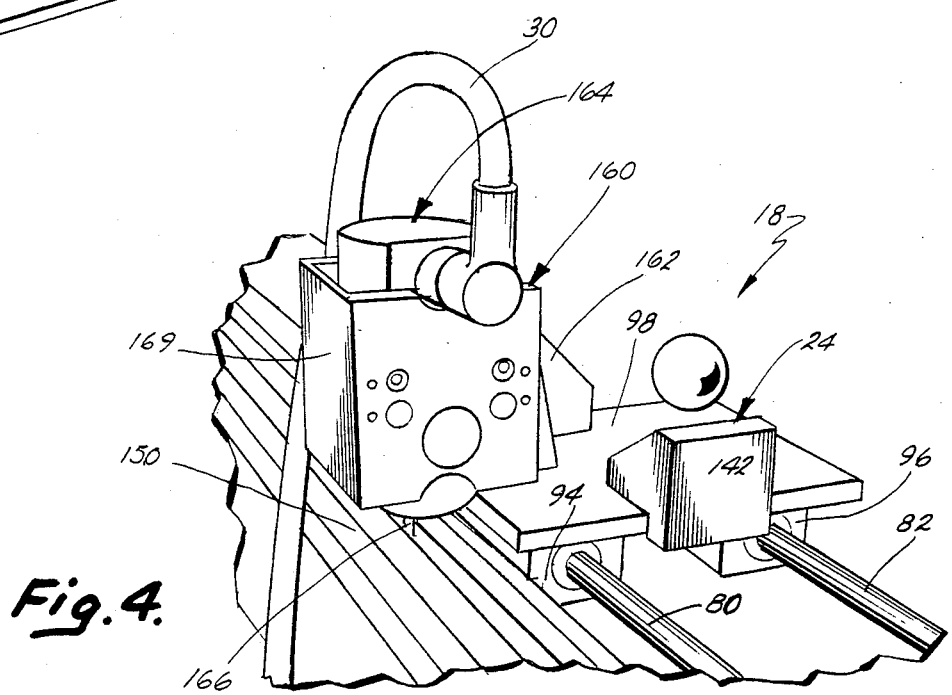
FIG. 4 is an enlarged, fragmentary, perspective view showing the carriage and a pinion encoder and rack of an alternative embodiment of the present invention.
Figure 5:
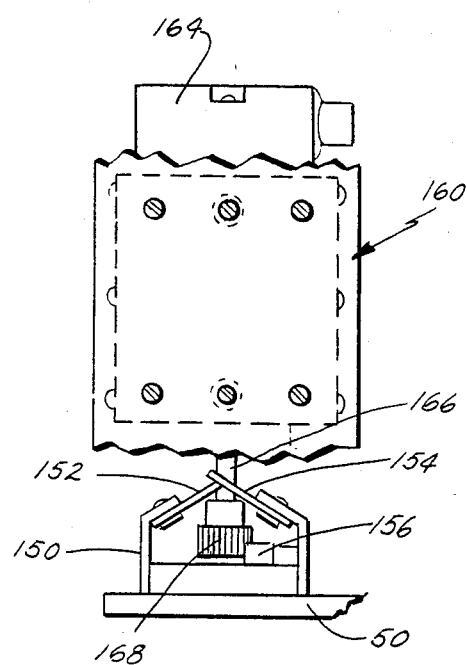
FIG. 5 is a front, elevational view showing the pinion encoder and rack structure.

In certain environments, it is believed that the glass etched scale 28 and reader 26 may be too fragile. The scale could be subject to breakage and/or misalignment if apparatus 10 is subjected to shocks or blows. In order to overcome such potential, an electromechanical measuring apparatus, shown in FIGS. 4–6, may be substituted for the reader of the embodiment of FIG. 1.

As shown, an elongated rack case 150 is supported on support 12 immediately adjacent one of the rails 80, 82. Case 150 is generally channel-shaped in cross section (FIG. 5) and includes flexible seals 152, 154. Mounted within case 150 is a precisely machined rack 156. Rack 156 extends the length of the case and hence substantially the entire length of support 12. A housing 160 is mounted on top plate 98 of carriage 18 by suitable supports or brackets 162. Supported within housing 160 is a digital encoder 164. Encoder 164 includes a shaft 166. A pinion gear 168 is nonrotatably secured to the shaft. Pinion gear 168 rides on and engages rack 156. Housing 160 includes spring plate sides 169 which precisely bias the pinion into engagement with the rack. As a result, linear movement of carriage 18 will be translated into rotational movement of shaft 166. Encoder 164, in a conventional fashion, translates rotational motion of shaft 166 into electrical pulse trains. These pulse trains are transmitted to the display 32 by cable 30. The rack and pinion digital display may be of the type sold by Anilam Electronics Corporation of Miami, Fla. By decoding the output from encoder 164, display 32 shows the position and direction of motion of carriage 18 with respect to the fixed anvil.

Figure 6:
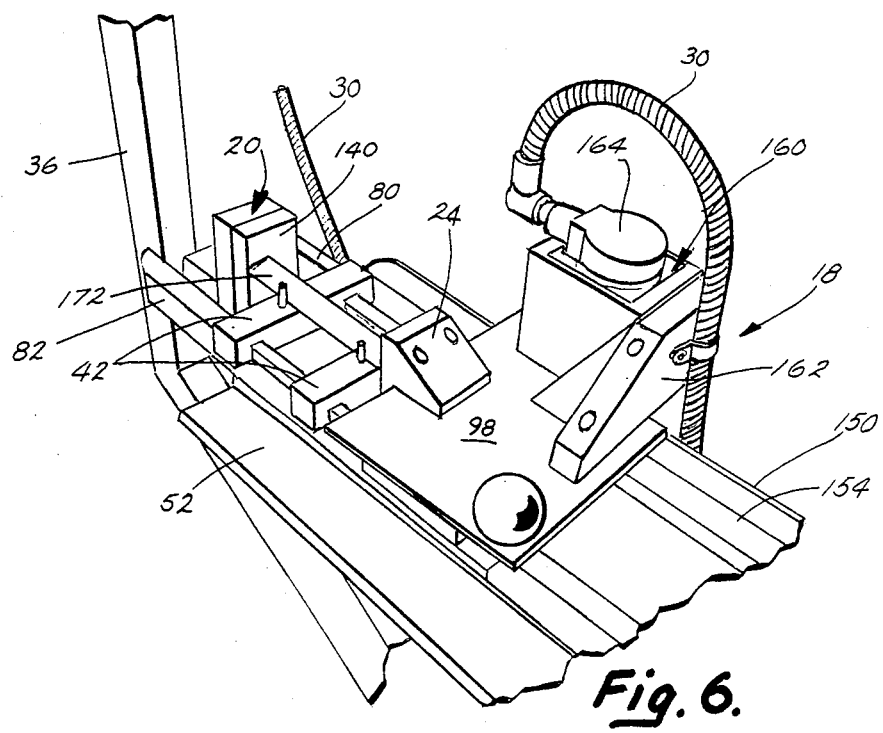
FIG. 6 is an enlarged, perspective view showing the apparatus of FIG. 4 in position to measure the linear dimension of an article.

As shown in FIG. 6, it is presently preferred that arm 36 supporting the digital display 32 extend generally longitudinally away from or be positioned behind fixed or stationary anvil 20. As a result, wide articles may be placed on support bars 42 without interference with the support arm 36.

OPERATION

In order to determine the linear dimension of an article using the apparatus in accordance with the present invention, the operator will initially remove the parallel bars 42 from the track or guide subassembly 16. Carriage 18 is moved toward stationary anvil 20 until surfaces 140, 142 abut. Digital display 32 is then zeroed. Carriage 18 is then moved away from the stationary anvil 20, the bars 42 are positioned on the track and an article 172 to be measured is laid on these support bars (FIG. 6). Carriage 18 is then moved back toward stationary anvil 20 until the anvils engage the ends of the article 172. The position of the movable anvil with respect to the fixed anvil 20 may then be read on the digital readout 32. This figure corresponds to the linear dimension of article 172 which is being measured.

With a measuring device in accordance with the present invention, the linear dimensions of an article may be accurately and rapidly checked with precise repeatability. This permits the proper matching of fabricated parts and accurate checking of the manufacturing process. The device permits the quality control checking of fabricated parts. The device is portable and may be wheeled to different locations in a user's facility or moved out of the way for storage purposes.

In view of the foregoing description, those of ordinary skill in the art will undoubtedly envision various modifications which would not depart from the inventive concepts disclosed herein. For example, separately supported tracks could be substituted for the tracks 80, 82 which are mounted on a common base or support. The common base or support is presently preferred, however, due to more precise and easier positioning of the tracks with respect to each other and the top planar surface of the support beam. Further, different mounting arrangements for the carriage 18 could possibly be employed. The linear ball bushing and shaft structure is preferred since such results in precise controlled positioning of the carriage and movable anvil. This increases the accuracy of the measurement. It is expressly intended, therefore, that the above description should be considered as only that of the preferred embodiments. The true spirit and scope of the present invention may be determined by reference to the appended claims.

The embodiments of the invention in which an exclusive property or privilege is claimed are defined as follows:

1. An apparatus for measuring a linear dimension of an article, said apparatus comprising:
   an elongated, horizontal support member having a longitudinal axis and defining an essentially flat, planar upper surface, said member being configured to position articles to be measured;
   a stationary anvil fixed to said support member adjacent an end of said support member and extending upwardly from said planar surface;
   a carriage;
   slide means on said support member for slidably mounting said carriage for longitudinal movement along said axis, said slide means including a pair of spaced, parallel, elongated rails extending along said planar upper surface of said elongated support, and said carriage including a pair of linear ball bushings, each bushing riding on one of said rails, and a plate extending between said bushings;
   a movable anvil on said carriage; and
   linear measuring means on said carriage and said support for generating an output indicating the position of said movable anvil relative to said fixed anvil as said carriage moves relative to said fixed anvil, whereby a linear dimension of an article placed on said support may be determined by movement of said movable anvil relative to said fixed anvil.

2. An apparatus as defined by claim 1 wherein said linear measuring means comprises:
   an elongated glass scale having gradations thereon, said scale extending along said support;
   a photoelectric reading head fixed to said carriage and operatively positioned for movement along said scale as said carriage moves along said support, said reading head generating an output signal; and
   digital readout means operatively connected to said reading head for receiving said signal and reading out the position of said carriage relative to said fixed anvil.

3. An apparatus as defined by claim 1 wherein said linear measuring means comprises:
   an elongated rack having a plurality of teeth, said rack being fixed to said support and extending parallel to the longitudinal axis thereof;
   an encoder supported on said carriage and including a pinion meshing with said rack, said encoder including means for generating an output indicating the position and direction of motion of said carriage relative to said fixed anvil; and
   digital readout means connected to said encoder for receiving said encoder output and reading out the position of said carriage relative to said fixed anvil.

4. An apparatus for measuring a linear dimension of an article, said apparatus comprising:
   an elongated, horizontal support member having a longitudinal axis and defining a planar upper surface;
   a stationary anvil fixed to said support member adjacent an end of said support member and extending upwardly from said planar surface;
   a carriage;
   slide means on said support member for slidably mounting said carriage for longitudinal movement along said axis;
   a movable anvil on said carriage; and
   linear measuring means on said carriage and said support for generating an output indicating the position of said movable anvil relative to said fixed anvil as said carriage moves relative to said fixed anvil, whereby a linear dimension of an article placed on said support may be determined by movement of said movable anvil relative to said fixed anvil, said apparatus further including at least two elongated bars positioned on said slide means for supporting the article to be measured.

5. An apparatus for measuring a linear dimension of an article, said apparatus comprising:
   an elongated, horizontal support member having a longitudinal axis and defining a planar upper surface;
   a stationary anvil fixed to said support member adjacent an end of said support member and extending upwardly from said planar surface;
   a carriage;
   slide means on said support member for slidably mounting said carriage for longitudinal movement along said axis;
   a movable anvil on said carriage; and
   linear measuring means on said carriage and said support for generating an output indicating the position of said movable anvil relative to said fixed anvil as said carriage moves relative to said fixed anvil, whereby a linear dimension of an article placed on said support may be determined by movement of said movable anvil relative to said fixed anvil, said slide means comprising:
   a pair of spaced, parallel, elongated guides extending along said planar upper surface of said elongated support, said carriage comprising:
   a pair of bushings, each bushing riding on one of said guides; and
   a plate extending between said bushings, said bushings being linear motion ball bushings, said linear measuring means comprising:
   an elongated glass etched scale extending along said support;
   a photoelectric reading head fixed to said carriage and operatively positioned for movement along said scale as said carriage moves along said support; and
   digital readout means operatively connected to said reading head for reading out the position of said carriage relative to said fixed anvil, said apparatus further including at least two elongated bars positioned on said slide means for supporting the article to be measured.

6. An apparatus for measuring a linear dimension of an article, said apparatus comprising:

an elongated, horizontal support member having a longitudinal axis and defining a planar upper surface;

a stationary anvil fixed to said support member adjacent an end of said support member and extending upwardly from said planar surface;

a carriage;

slide means on said support member for slidably mounting said carriage for longitudinal movement along said axis;

a movable anvil on said carriage; and linear measuring means on said carriage and said support for generating an output indicating the position of said movable anvil relative to said fixed anvil as said carriage moves relative to said fixed anvil, whereby a linear dimension of an article placed on said support may be determined by movement of said movable anvil relative to said fixed anvil, said slide means comprising:

a pair of spaced parallel, elongated guides extending along said planar upper surface of said elongated support, said carriage comprising:

a pair of bushings, each bushing riding on one of said guides; and a plate extending between said bushings, said bushings being linear motion ball bushings, said linear measuring means comprising:

an elongated rack having a plurality of teeth, said rack being fixed to said support and extending parallel to the longitudinal axis thereof;

an encoder supported on said carriage and including a pinion meshing with said rack, said encoder including means for generating an output indicating the position and direction of motion of said carriage relative to said fixed anvil; and digital readout means connected to said encoder for receiving said encoder output and reading out the position of said carriage relative to said fixed anvil, said apparatus further including at least two elongated bars positioned on said slide means for supporting the article to be measured.

* * * * *